US009876720B2

(12) United States Patent
Larsen et al.

(10) Patent No.: US 9,876,720 B2
(45) Date of Patent: *Jan. 23, 2018

(54) REDUCING NETWORK LATENCY DURING LOW POWER OPERATION

(71) Applicant: Intel Corporation, Santa Clara, CA (US)

(72) Inventors: Steen K. Larsen, Hillsboro, OR (US); Bryan E. Veal, Beaverton, OR (US); Daniel S. Lake, Hillsboro, OR (US); Travis T. Schluessler, Hillsboro, OR (US); Mazhar I. Memon, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/628,834

(22) Filed: Feb. 23, 2015

(65) Prior Publication Data

US 2015/0163143 A1 Jun. 11, 2015

Related U.S. Application Data

(63) Continuation of application No. 12/313,548, filed on Nov. 21, 2008, now Pat. No. 8,984,309.

(51) Int. Cl.
*G06F 1/32* (2006.01)
*H04L 12/801* (2013.01)
*H04L 12/12* (2006.01)
*H04L 12/861* (2013.01)

(52) U.S. Cl.
CPC ............ *H04L 47/12* (2013.01); *G06F 1/3209* (2013.01); *H04L 12/12* (2013.01); *H04L 49/90* (2013.01); *Y02B 60/34* (2013.01)

(58) Field of Classification Search
CPC ......... H04L 47/12; H04L 12/12; H04L 49/90; G06F 1/3209
See application file for complete search history.

(56) References Cited

U.S. PATENT DOCUMENTS

| | | | |
|---|---|---|---|
| 6,549,954 B1 | 4/2003 | Lambrecht | |
| 6,591,368 B1 | 7/2003 | Ryu | |
| 8,024,590 B2 | 9/2011 | Song | |
| 2003/0169758 A1* | 9/2003 | Lavigne | H04L 49/103 370/428 |
| 2006/0075210 A1* | 4/2006 | Manohar | G01D 21/00 712/36 |
| 2007/0070904 A1 | 3/2007 | King | |
| 2007/0136617 A1 | 6/2007 | Kanno | |
| 2008/0037546 A1* | 2/2008 | Ishikawa | H04L 47/10 370/392 |
| 2008/0162964 A1 | 7/2008 | Dahlen | |
| 2008/0168285 A1* | 7/2008 | de Cesare | G06F 1/3203 713/320 |

(Continued)

*Primary Examiner* — Thomas Lee
*Assistant Examiner* — Vincent Chang
(74) *Attorney, Agent, or Firm* — Trop, Pruner and Hu, P.C.

(57) ABSTRACT

In an embodiment, a method includes identifying a core of a multicore processor to which an incoming packet that is received in a packet buffer is to be directed, and if the core is powered down, transmitting a first message to cause the core to be powered up prior to arrival of the incoming packet at a head of the packet buffer. Other embodiments are described and claimed.

20 Claims, 4 Drawing Sheets

(56) References Cited

U.S. PATENT DOCUMENTS

2008/0182630 A1 7/2008 Parks
2009/0150689 A1 6/2009 Simeral
2009/0150695 A1 6/2009 Song
2012/0023355 A1 1/2012 Song

* cited by examiner

REDUCING NETWORK LATENCY DURING LOW POWER OPERATION

This application is a continuation of U.S. patent application Ser. No. 12/313,548, filed Nov. 21, 2008, the content of which is hereby incorporated by reference.

BACKGROUND

Power and thermal management are becoming more challenging than ever before in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) to control hardware elements. Most modern OS's use the Advanced Configuration and Power Interface (ACPI) standard, e.g., Rev. 3.0b, published Oct. 10, 2006, for optimizing the system in these areas. An ACPI implementation allows a core to be in different power-saving states (also termed low power or idle states) generally referred to as so-called C1 to Cn states. Similar socket C-states exist for package-level power savings.

When a core is active, it runs at a so-called C0 state, and when the core is idle, it may be placed in a core low power state, a so-called core non-zero C-state. The core C1 state represents the low power state that has the least power savings but can be switched on and off almost immediately, while an extended deep-low power state (e.g., C3) represents a power state where the static power consumption is negligible, but the time to enter into this state and respond to activity (e.g., back to C0) is quite long.

As core and socket sleep states get more aggressive in saving power, one impact is an increase in the time required for the system to respond to bursty asynchronous events such as network traffic. It is anticipated that systems such as servers will have socket wakeup latencies (e.g., from C6 to C0) on the order of 75 microseconds (μs). In addition to a direct impact to latency for the core to wakeup, there is an impact to throughput when there are multiple cores potentially entering sleep states. Systems with aggressive power down algorithms can significantly impact throughput as the cores drop off to deep sleep states and then need to be awakened as traffic arrives. In some cases, about a 70% reduction in throughput could occur. For example, in a multiprocessor 16 threaded case, a line rate of approximately 9 gigabits per second (Gbps) (assuming no sleep states enabled) can exist. However, as increasing numbers of threads drop off to sleep states, sustained bandwidth is reduced to less than 2 Gbps, using current mechanisms.

Power consumption is often traded off for system performance. This is because it is difficult or impossible for various system components to predict the appropriate time to drop to a low power state and for what duration. Network, storage and other input/output (I/O) devices can require system or central processing unit (CPU) attention at any moment, forcing system components to stay at an excessively high power level to anticipate any I/O event, thus causing the trade off.

DETAILED DESCRIPTION

Figure 1:
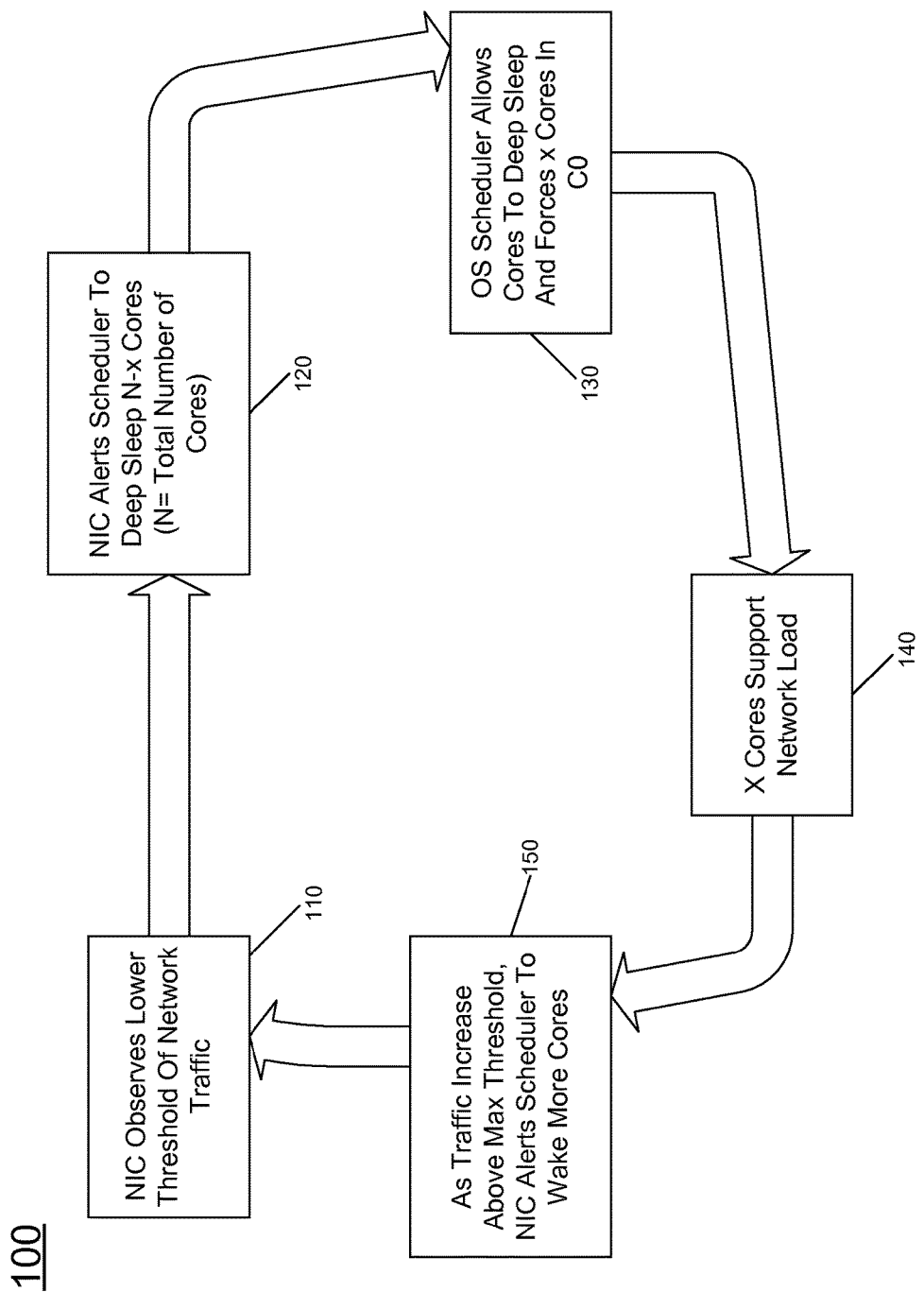
FIG. 1 is a flow diagram of a method in accordance with one embodiment of the present invention.

In various embodiments, as traffic patterns or other system conditions fluctuate, one or more cores of a system may be placed in a lower power state to reduce power consumption. For example, a system may be controlled to have at least one core always be enabled to support incoming traffic events. This powered-on core can be enabled by a message (e.g., interrupt driven) from a network interface controller (NIC) or other peripheral interface to an operating system (OS) scheduler (or other power management controller), indicating a trend toward a lower network traffic level. Note that this lower network traffic might be a night-time event or other idle period. The power management controller or scheduler, upon receiving the "hint" message from the NIC driver, can sequester one or more cores tasked to stay awake and direct any received network input/output (I/O) traffic to those dedicated cores. As traffic increases, either the scheduler or the NIC can trigger more cores to come out of sleep states.

The amount of traffic can help determine the number of cores that need to be kept in a powered on (e.g., a C0) state. Depending on the latency and bandwidth requirements of expected bursts, one core may be sufficient for mitigating latency up to approximately 1 Gbps, or two cores may handle bursts up to 10 Gbps, as an example.

In an alternate embodiment, instead of using an OS scheduler, the NIC can send network utilization information to a power management entity running on a separate microcontroller or processor. In one embodiment, the power management entity may be a power management unit, such as a microcontroller dedicated to fine-grained control of the power management states of the cores and other system components. This power management entity may then make power state decisions for individual cores using this data alone, or in conjunction with other power relevant factors gathered from other parts of the system such as storage devices or so forth. In another embodiment, a CPU core resident process can monitor aggregate system level network utilization and make core activation decisions or recommendations to the power management entity. This would allow for decisions based on overall system network I/O, rather than just the I/O of a single NIC.

Understand that the above discussion of a NIC represents one embodiment of the general case where any peripheral device sends or receives data from a host platform, so that communication latency to the host platform can be reduced when it is in a low power state.

In an embodiment, a plurality of peripheral devices may cooperate with each other, a CPU core resident process and/or a power management entity running on a separate microcontroller or processor to determine power management decisions. For example, one such peripheral device may be a backup drive attached to the system. Based on incoming network traffic, e.g., as determined via a network interface controller and the level of activity needed for handling a backup operation (or lack of backup operations), one or more cores may be placed in a low power state such as a deeper sleep state. These peripheral devices, e.g., the NIC and backup drive, may send hint messages to a power management unit of a processor. In turn, based on this information, the power management unit may determine that one or more cores should be placed in a low power/sleep state.

In some implementations, such as a multiprocessor system having a heterogeneous core environment, particular cores may be controlled to remain in a power on state. For example, in a multi-core processor having heterogeneous cores, a low power core can easily handle a traffic flow less than 100 megabits per second (mbps). Such a low power core does not include an out-of-order (OOO) engine or have the large cache advantages of other cores present in the system. By allowing high power cores to go to sleep, embodiments may conserve power. But by keeping a small number of low power cores active, the system's ability to respond with very low latency to new incoming requests is maintained.

Embodiments thus conserve power while allowing faster response times to new network messages. In contrast, current power management does not account for the bursty networking load, and thus incurs a slower response time to new incoming requests in order to conserve power by placing the system in a deep sleep.

Referring now to FIG. 1, shown is a flow diagram of a method in accordance with one embodiment of the present invention. As shown in FIG. 1, method 100 may be used to base power management decisions at least in part on network traffic. As shown in FIG. 1, method 100 may begin by observing a traffic level of a network connection (block 110). More specifically, a NIC may observe the level of network traffic, e.g., based on a rate of incoming packets and determine that the traffic rate is below a given threshold level. For example, a NIC may regularly monitor traffic levels and compare the monitored levels to a series of network traffic thresholds. These thresholds may, in one embodiment correspond to a high level of network traffic, a medium level of network traffic, and a low level of network traffic. While the scope of the present invention is not limited in this regard, these thresholds may correspond to packet rates of, respectively 10 gigabits per second (Gbps), one Gpbs, and 100 megabits per second (mbps). At regular intervals, or on a change in determined levels of network traffic, the NIC may send a message that may act as a power management hint to one or more locations to cause at least some cores to go into a sleep state such as deep sleep state (block 120). For example, as discussed above in some implementations this power management hint message may be sent to an OS scheduler. In other embodiments the power management hint may be sent to a power management entity such as a PMU of a processor. In still other embodiments, the power management hint may be sent directly to one or more cores of the system. As shown in FIG. 1, at least one core may remain in a normal power state (C0) to handle the low level of network traffic. More specifically, the NIC may cause N-X cores to be placed in a deep sleep state, where N is the total number of cores and X is the number of cores remaining powered on.

Referring still to FIG. 1, the OS scheduler may, responsive to this power management hint message cause one or more cores to be placed into a deep sleep state, e.g., a C6 or C7 state (block 130). Still further, the OS scheduler may maintain at least one core in a powered on state (e.g., C0). This one or more powered on core may thus handle incoming network traffic (block 140). In this way, the system may realize significant power saving benefits while being also able to handle the level of network traffic, without latency issues or impact to sustained bandwidth.

However, assume that over time the network traffic level changes, e.g., as a user of the system requires more network resources to handle bursty communication patterns such as Internet traffic. Accordingly, as the traffic increases, the NIC may determine that the network traffic has passed one or more thresholds (block 150). Accordingly, the NIC may send another power management hint message to the scheduler, namely a message that causes the scheduler to cause one or more of the deep sleep state cores to be placed into a normal power mode. While shown with this particular implementation in the embodiment of FIG. 1, the scope of the present invention is not limited in this regard.

Figure 2:
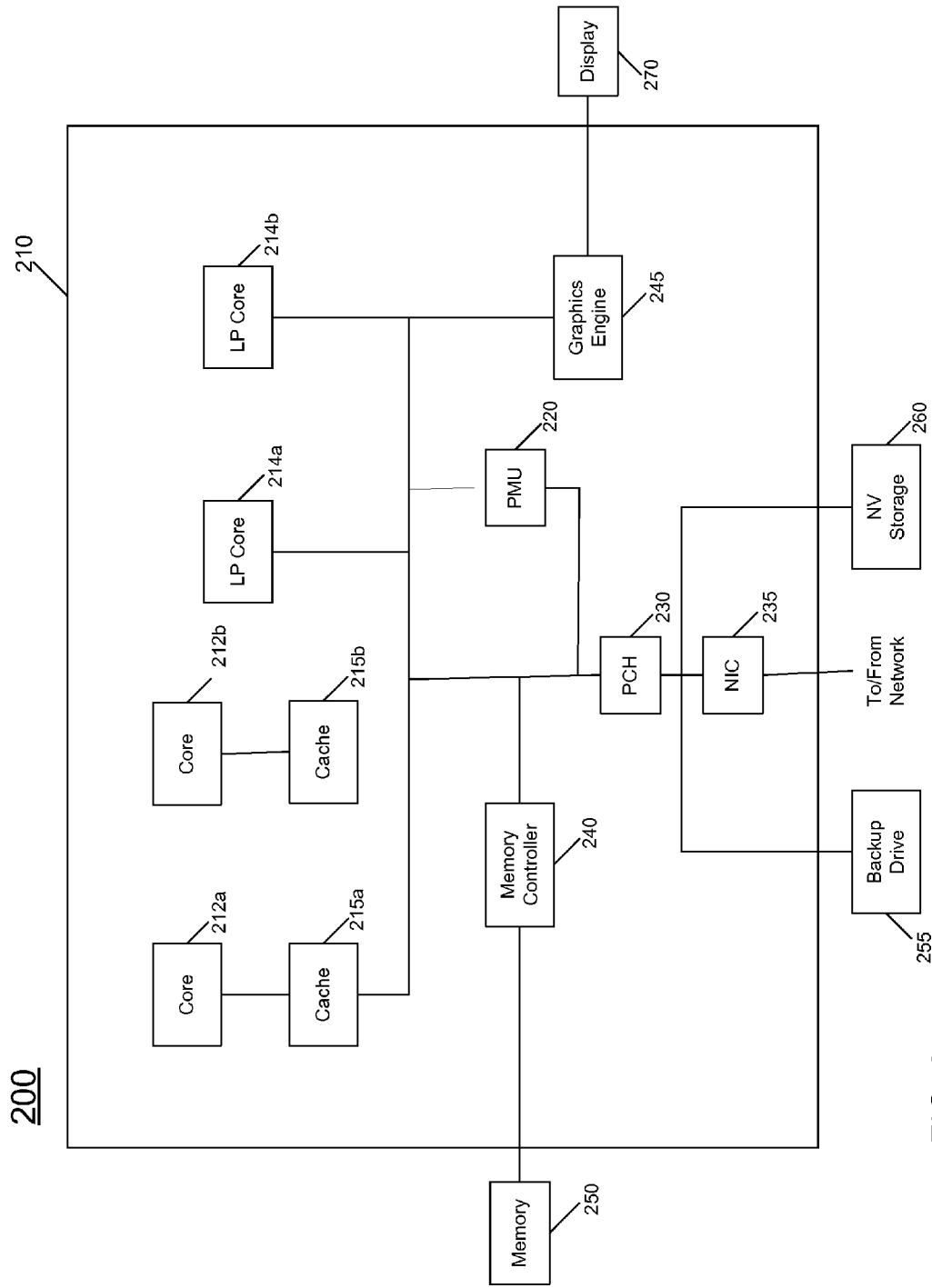
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 200 may be any given computer system such as a mobile system, desktop system, server computer or the like. As shown in FIG. 2, system 200 includes a processor 210 that may be a multi-core processor. In the embodiment of FIG. 2, processor 200 includes a plurality of cores, including cores 212a and 212b, which may be cores configured to handle various processing tasks and each of which may be associated with a corresponding cache memory 215a and 215b. In addition, low power cores 214a and 214b may be present. These smaller cores may operate using lower power consumption, and which provide for handling of more basic processing tasks (e.g., without OOO execution) at reduced power consumption. As seen, these cores may not have caches associated with them.

Referring still to FIG. 2, processor 210 may further include a power management unit (PMU) 220, which may be a microcontroller or other programmable logic to handle power management activities for the processor. Such activities may be performed based on information received from various peripheral devices. For example, as shown in FIG. 2, PMU 220 may be coupled to a peripheral controller hub (PCH) 230 that in turn is coupled to various peripheral devices such as a NIC 235 which may be coupled in a wired or wireless manner to a network. In addition, other peripheral devices include a non-volatile (NV) storage 260, which may be a hard drive, flash storage, ferroelectric memory or so forth. System 200 may further include a backup drive 255, which may an external backup drive to handle backup operations on a regular basis.

As further shown in FIG. 2, processor 210 may further be coupled to a system memory 250, such as a dynamic random access memory (DRAM) via a memory controller 240. In addition, processor 210 may be coupled to a display 270 via a graphics engine 245 which, in one embodiment may be a different type of processing engine, such as a dedicated graphics processor. While shown with this particular implementation in the embodiment of FIG. 2, the scope of the present invention is not limited in this regard.

During operation of system 200, PMU 220 may receive messages from various peripheral devices such as NIC 235, NV storage 260 and/or backup drive 255. Based on these messages, which may be power management hints, one or more of cores 212 and 214 may be powered down depending upon the level of activity in the system. Note as used herein the terminology power down means to be placed into a lower power utilization state (e.g., from C0 to C1 or so forth), and not necessarily into a fully powered off state (e.g., C6). Similarly, the terminology power up means to be placed into a higher power utilization state. For example, with reference to FIG. 2 assume that no backup activities are occurring with backup drive 255 and that non-volatile storage 260 has not been accessed. Further assume that a limited amount of network traffic is occurring via NIC 235. In this instance, based on power management hints from these components, PMU 220 may cause cores 212*a* and 212*b* and their associated caches to be placed into a deep sleep state, e.g., a C6 state. Still further, depending upon the limited level of network traffic, one of low power cores 214 may also be placed in a deep sleep state, thus enabling continued handling of the reduced network traffic via the singled enabled low power core and maximizing the power saving benefits.

Embodiments may further send additional power management hints between I/O devices and other system components. More specifically, in some implementations packet buffering and flow directors implemented in a NIC can be used to send targeted power management messages to system components. For example, power management hints may be sent by the NIC to I/O subsystem and CPU cores (among possibly other system components) depending on the state of packet buffers of the NIC. For example, if all packet buffers are empty in the NIC, power down hints can be sent to all relevant platform components. Another example is if packets belonging to a set of flows occupy the NIC's buffers, power up hints are sent to only cores that will handle those packets and power down events are sent to all other cores and components. In one embodiment, flow matching logic may be used to determine the appropriate core to remain powered.

The basic flow of operation is as follows. As packets enter each NIC packet receive buffer, lookup logic (e.g., implemented as a content addressable memory (CAM)) references a classification table that matches flows to cores targeted to receive them. The lookup logic computes the set of cores that will be receiving packets soon. Various manners of determining when a core will receive a corresponding packet may be used. Based on such computations, power up hints can be sent to cores that will be receiving packets soon, while power down hints can be sent to all other cores. Similarly, if the platform topology is known, the NIC can send hints to other platform components (e.g., front side bus (FSB) logic, and input/output hub (IOH), etc.) that correspond to the targeted cores.

Figure 3:
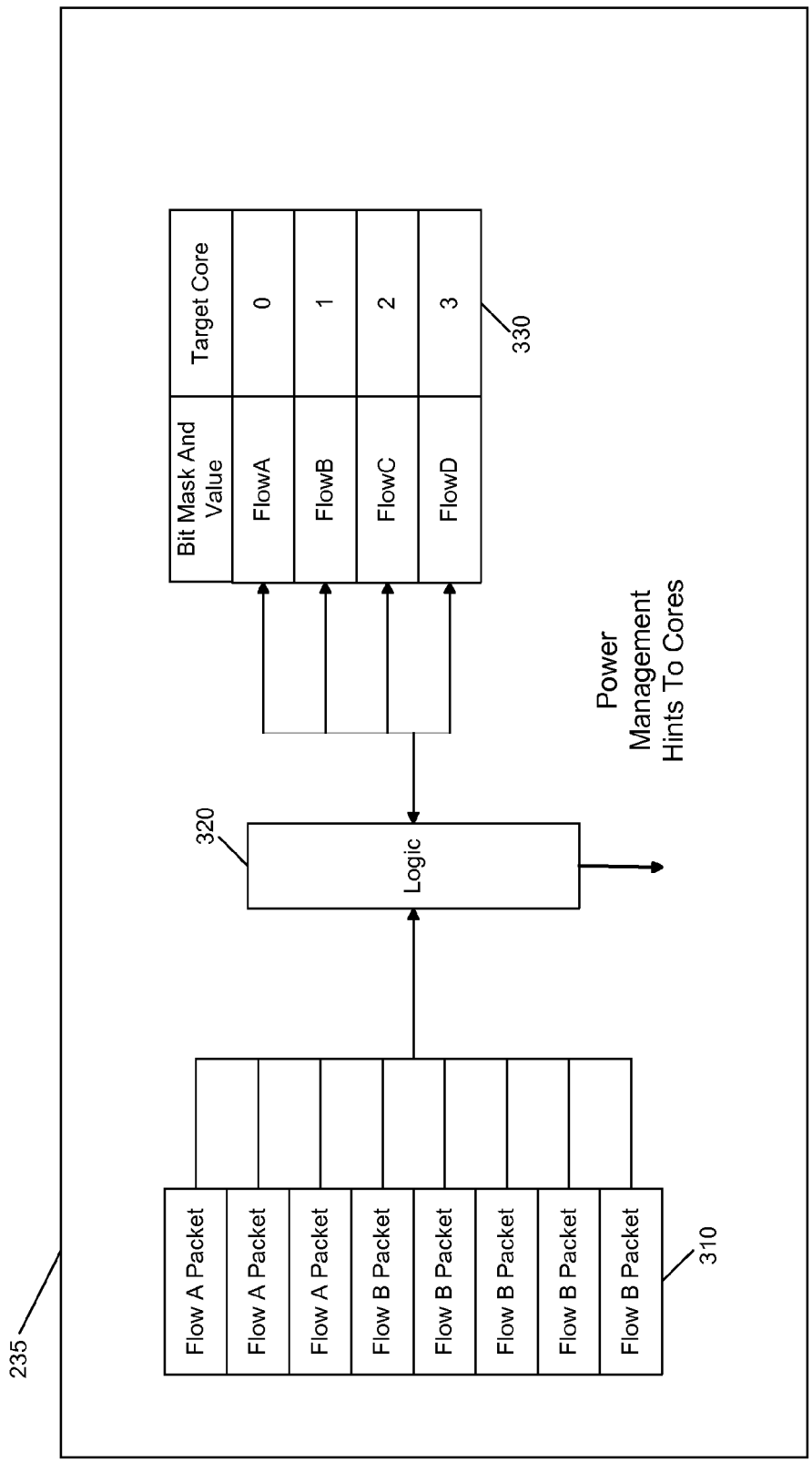
FIG. 3 is a block diagram of a network interface controller in accordance with one embodiment of the present invention.

Referring now to FIG. 3, shown is a block diagram of a network interface controller in accordance with one embodiment of the present invention. As shown in FIG. 3, NIC 235, which may be the NIC in system 200 of FIG. 2, may be configured to receive incoming packets from a network connection, e.g., via one or more ports. NIC 235 may determine a level of traffic. In addition, NIC 235 may associate flows of the incoming packets with given cores. By this association, NIC 235 may, depending on the level of network traffic, determine that one or more cores can be in a low power state. Accordingly, NIC 235 may generate and send power management hints, either directly to the cores themselves, to a power management unit that handles power management functions for the cores, or to an OS scheduler to perform power management activities.

As shown in FIG. 3, NIC 235 includes a plurality of packet buffers 310. Each packet buffer may include one or more entries to store incoming packets. As seen, the incoming packets may include or be provided with a flow identifier for a given flow director with which the given packet is associated. For example, different applications each may include one or more different flows. For example, there may be multiple incoming packets for different streaming video or audio applications, incoming packets for Internet applications and so forth. Each such application may thus have one or more flows associated therewith. More specifically, each flow may have an identifier. As seen in FIG. 3, each packet stored in packet buffer 310 may include such a flow identifier.

In addition, NIC 235 includes a logic 320, which may be a lookup logic to reference a packet classification table 330 based on the flow identifiers. As seen, table 330 may be a mapping table to match flows with a given core. Thus in the implementation of FIG. 3, it can be seen that the incoming packets stored in packet buffer 310 are associated with a flow A and a flow B. Accordingly, logic 320 may determine that packet buffer 310 includes solely such packets. Accordingly, based on reference to table 330, logic 320 determines that target cores 0 and 1 will receive these packets. Since no packets in packet buffer 310 are associated with flows for the other cores (e.g., cores 2 and 3), logic 320 may send power management hints to power off these cores. Additional power management hints may be sent to indicate that the incoming packets will be sent to cores 0 and 1 when they reach a head of the packet buffer. Thus if these cores are currently in a low power state, they may be woken up and placed into an active state to handle the incoming packets without latency. While shown with this particular implementation in the embodiment of FIG. 3, the scope of the present invention is not limited in this regard.

Figure 4:
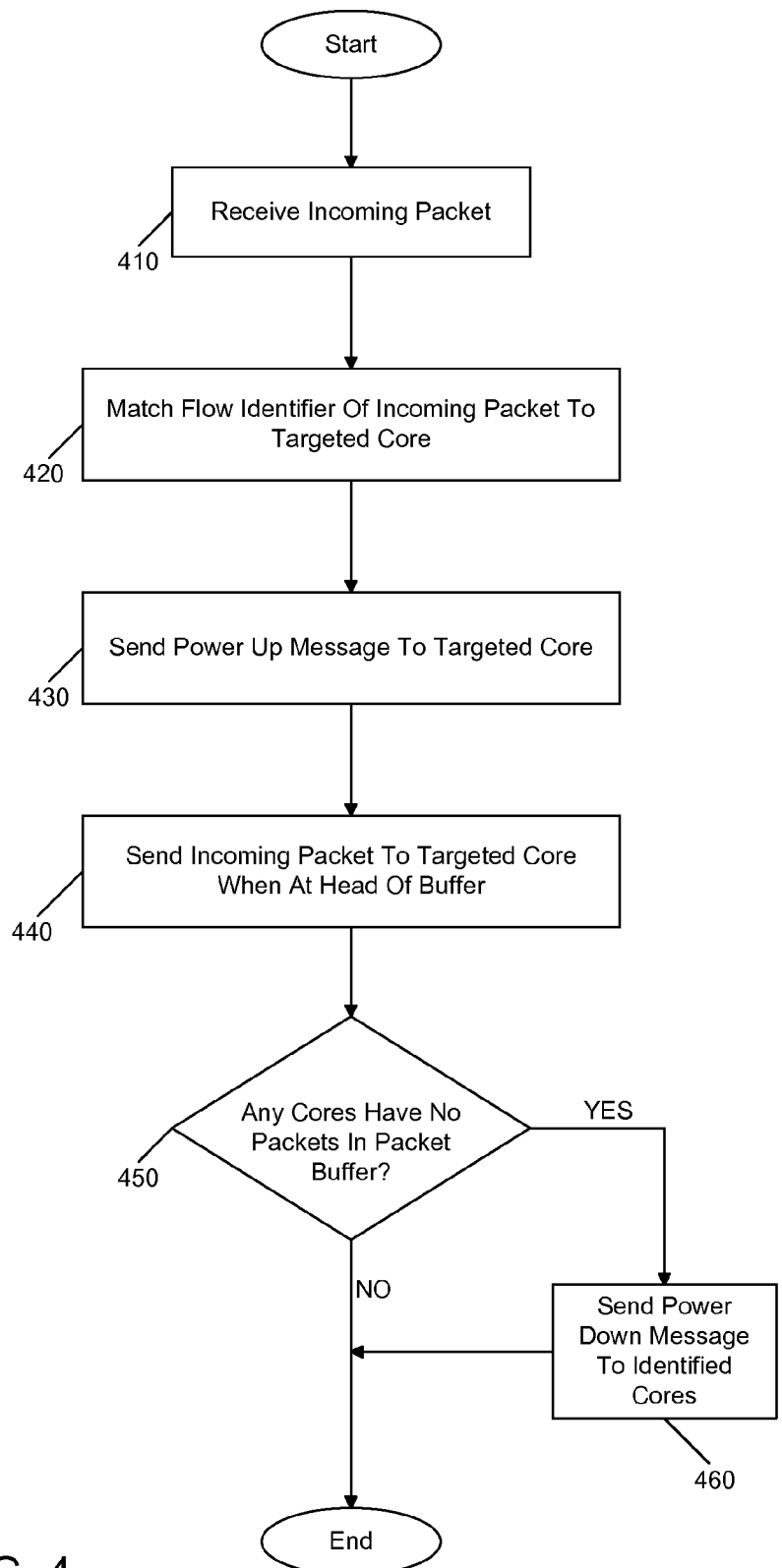
FIG. 4 is a flow diagram of a method of generating power management hints based on incoming packets.

Referring now to FIG. 4, shown is a flow diagram of a method of generating power management hints based on incoming packets. As shown in FIG. 4, method 400 may begin by receiving an incoming packet (block 410). For example, the incoming packet may be received in a packet buffer of a NIC. Next, a flow identifier associated with the packet may be matched to a targeted core (block 420). For example, CAM logic may be used to determine to which core a given flow identifier is mapped. Based on this mapping, a power up message may be sent to the targeted core (block 430). For example, in one embodiment the NIC may send a power management hint to a power management unit, OS scheduler, or directly to the core to cause the core to be powered up, if it is in a low power state.

Referring still to FIG. 4, when the incoming packet reaches a head of the packet buffer, it may be sent to the targeted core (block 440). Accordingly, by way of the previously sent power management hint, the core will be powered up and ready to handle the packet with minimal latency.

Still referring to FIG. 4, it may be determined at diamond 450 whether one or more cores have no incoming packets in the packet buffer. This determination again may be made with reference to a mapping table that associates flows associated with the incoming packets in the packet buffer with targeted cores. If any such cores are identified, power management hints may be sent to these cores to enable them to be powered down (block 460). Note that the determination of diamond 450 may be done at other times, such as during the matching done at block 420. While shown with this particular implementation in the embodiment of FIG. 4, the scope of the present invention is not limited in this regard.

Embodiments thus provide power hints that are targeted to specific platform components that need to be activated to process incoming I/O traffic. This is a more precise approach than using heuristics that make hardware sleep at successively lower power states based on hard-coded idle intervals such as implemented in conventional power management techniques.

Embodiments thus can be implemented in a way that not only reduces power consumption, but also with little or no performance degradation (which is not the case with heuristic-based power management). For example, the NIC can calculate the rate of packet communication into and out of each packet buffer, and send power up hints to the appropriate cores such that they will be woken up by the time the corresponding packets arrive at the head of the packet buffer. At this point, the packet is delivered to fully powered up cores. Similarly, the NIC can more accurately predict the maximum time cores can be sleeping based on the contents of each packet buffer.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an incoming network packet at a packet buffer of a network interface device:
   in response to a receipt of the incoming network packet at the packet buffer, identifying, by the network interface device, a core of a multicore processor to which the incoming packet that is received at the packet buffer is to be directed;
   determining whether the core is powered down; and
   in response to a determination that the core is powered down, generating, by the network interface device, a first message to cause the core to be powered up prior to arrival of the incoming network packet at a head of the packet buffer of the network interface device, wherein the incoming network packet is to be the initial network packet received by the core after the core is powered up.

2. The method of claim 1, further comprising sending the incoming packet to the core after the incoming network packet arrives at the head of the packet buffer.

3. The method of claim 1, further comprising prior to receipt of the incoming network packet in the packet buffer, determining a level of network traffic of a network coupled to the multicore processor and responsive to a determination that the level of activity is less than a threshold level, transmitting an initial message to cause the core to be powered down.

4. The method of claim 1, wherein the incoming network packet includes an incoming packet flow identifier, and wherein identifying the core to which the incoming network packet is to be directed comprises accessing a mapping table that maps each flow identifier to a corresponding core identifier.

5. The method of claim 4, further comprising accessing the mapping table using a content addressable memory.

6. The method of claim 1, further comprising transmitting a second message to a component associated with the core to cause the component to be powered up if the core is powered down.

7. The method of claim 1, further comprising, prior to transmitting the first message, powering down a plurality of cores of the multicore processor responsive to determining that a traffic rate of incoming network packets to the multicore processor is less than a threshold.

8. The method of claim 7, further comprising:
   after powering down the first group of cores, receiving a plurality of network packets, wherein each network packet includes a corresponding flow identifier that is to indicate to which core the packet is to be directed; and
   for each network packet of the plurality of network packets, responsive to a determination that the corresponding core to which the network packet is to be sent is in the low power state, send a corresponding message to cause the corresponding core to be placed into the active state prior to arrival of the network packet at the corresponding core.

9. An article comprising a non-transitory machine-accessible storage medium including instructions that when executed cause a system to:
   compare a level of traffic received at a network interface to a traffic threshold and based on the comparison, send a first message from the network interface to cause a first core of a processor to be placed into a low power state; and
   after the first message is sent, responsive to a packet received at the network interface and directed to the first core:
      determining, by the network interface, whether the first core is in the low power state;
      in response to a determination that the first core is in the low power state, send a second message from the network interface to cause the first core to transition from the low power state to an active state prior to arrival of the packet at a head of a packet buffer of the network interface, wherein the packet is to be the initial packet received by the first core after the first core enters the active state.

10. The article of claim 9, further comprising instructions that when executed enable the system to send the packet from the packet buffer to the first core after the packet reaches the head of the packet buffer.

11. The article of claim 9, further comprising instructions that when executed enable the system to associate the incoming packet with a flow identifier and based on the flow identifier, to determine that packet is to be directed to the first core.

12. The article of claim 9, further comprising instructions that when executed enable the system to:
   receive a plurality of packets, wherein each packet includes a corresponding flow identifier that is to indicate to which core of the processor the packet is to be directed; and
   for each packet of the plurality of packets, if the corresponding core to which the packet is to be sent is in the low power state, send a corresponding message to cause the corresponding core to be placed into the active state prior to arrival of the packet at the corresponding core.

13. The article of claim 12, further comprising instructions that when executed enable the system to place each packet of the plurality of packets received into one of a plurality of packet buffers, and for each packet if the corresponding core to which the packet is to be sent is in the low power state the corresponding message is to cause the corresponding core to be placed into the active state prior to arrival of the packet at a head of the one of the plurality of packet buffers.

14. An apparatus comprising:
a packet buffer to store packets received from at a network interface from a network, wherein the packet buffer includes a plurality of entries, each entry to store a corresponding packet and a corresponding flow identifier; and
logic to:
based on the corresponding flow identifier, match a first stored packet in the packet buffer with a first core of a multicore processor to which the first stored packet is to be sent,
determine whether the first core is in a low power state, and
in response to a determination that the first core is in a low power state, send a first message to cause the first core to be powered up to exit the low power state, wherein the first core is to be powered up prior to arrival of the first stored packet at a head of the packet buffer, wherein the first stored packet is to be the initial packet received by the first core after the first core is powered up.

15. The apparatus of claim 14, wherein the logic is further to send the first stored packet to the first core after the first stored packet reaches the head of the packet buffer.

16. The apparatus of claim 14, wherein the logic is further to transmit a second message to cause at least one other core to be powered down responsive to an absence within the buffer of packets to be directed to the at least one other core.

17. The apparatus of claim 14, wherein the apparatus comprises a network interface controller (NIC).

18. The apparatus of claim 17, wherein the NIC is to send the first message to an operating system (OS) scheduler.

19. The apparatus of claim 17, wherein the NIC is to send the first message to the target core.

20. The apparatus of claim 14, wherein prior to storage of the first packet, the logic is to determine a level of network traffic received from the network, compare the level to a traffic threshold and determine a comparison result, and based on the comparison result, determine whether to cause the first core to be placed into the low power state.

* * * * *